US010205800B2

United States Patent
Yang et al.

(10) Patent No.: US 10,205,800 B2
(45) Date of Patent: Feb. 12, 2019

(54) APPLICATION TAKEOVER METHOD AND SYSTEM, MOBILE TERMINAL, AND SERVER

(71) Applicant: HUAWEI TECHNOLOGIES CO., LTD., Shenzhen, Guangdong (CN)

(72) Inventors: Fen Yang, Nanjing (CN); Fanfan Xue, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 14/584,121

(22) Filed: Dec. 29, 2014

(65) Prior Publication Data

US 2015/0113113 A1  Apr. 23, 2015

Related U.S. Application Data

(63) Continuation of application No. PCT/CN2014/083791, filed on Aug. 6, 2014.

(30) Foreign Application Priority Data

Aug. 14, 2013  (CN) .......................... 2013 1 0354128

(51) Int. Cl.
*G06F 15/173* (2006.01)
*H04L 29/08* (2006.01)
(Continued)

(52) U.S. Cl.
CPC .............. *H04L 67/34* (2013.01); *H04W 4/14* (2013.01); *H04W 4/21* (2018.02); *H04W 4/50* (2018.02); *H04W 4/70* (2018.02)

(58) Field of Classification Search
CPC ..... H04L 67/34; H04L 67/36; H04L 67/1095; H04W 4/001; H04W 4/005; H04W 4/14;
(Continued)

(56) References Cited

U.S. PATENT DOCUMENTS

| 8,949,469 B2 * | 2/2015 | Gerdes ...................... G06F 8/65 |
| | | 709/248 |
| 2007/0136392 A1 * | 6/2007 | Oh ....................... G06F 9/44505 |
| | | 707/999.201 |

(Continued)

FOREIGN PATENT DOCUMENTS

| AG | 10-2012-0092469 | 8/2012 |
| CN | 102629930 A | 8/2012 |

(Continued)

OTHER PUBLICATIONS

Extended European Search Report dated Aug. 8, 2016 in corresponding European Patent Application No. 13900740.5.
(Continued)

*Primary Examiner* — Liang Che A Wang
*Assistant Examiner* — Ayele F Woldemariam
(74) *Attorney, Agent, or Firm* — Staas & Halsey LLP

(57) ABSTRACT

The present invention discloses an application takeover method and system, a mobile terminal, and a server. The application takeover method includes: receiving, by a server, an application takeover instruction sent by a first terminal, where the application takeover instruction includes an identifier of a second terminal and information about an application, of the first terminal, to be taken over, the application takeover instruction is used to make the application of the first terminal be taken over by the second terminal, and the application takeover instruction is generated by the first terminal based on sending an application takeover request to the second terminal and receiving a takeover accept response returned by the second terminal; and establishing, by the server, a takeover correspondence between the first terminal and the second terminal according to the application takeover instruction.

15 Claims, 10 Drawing Sheets

(51) Int. Cl.
*H04W 4/70* (2018.01)
*H04W 4/21* (2018.01)
*H04W 4/50* (2018.01)
*H04W 4/14* (2009.01)

(58) Field of Classification Search
CPC .... H04W 4/206; G06F 8/61; G06F 17/30575; G06F 21/10; G06F 3/0647
See application file for complete search history.

(56) References Cited

U.S. PATENT DOCUMENTS

| | | | |
|---|---|---|---|
| 2011/0055823 A1* | 3/2011 | Nichols | G06F 9/4451 |
| | | | 717/174 |
| 2011/0065384 A1* | 3/2011 | Cader | H04M 3/58 |
| | | | 455/41.1 |
| 2011/0169731 A1 | 7/2011 | Takenaka et al. | |
| 2013/0041790 A1* | 2/2013 | Murugesan | G06F 9/4856 |
| | | | 709/217 |
| 2013/0080525 A1* | 3/2013 | Aoki | H04L 67/26 |
| | | | 709/204 |
| 2014/0344680 A1 | 11/2014 | Kim | |

FOREIGN PATENT DOCUMENTS

| | | |
|---|---|---|
| CN | 102752327 | 10/2012 |
| CN | 102984226 | 3/2013 |
| CN | 103428671 | 12/2013 |
| EP | 2 523 109 A1 | 11/2012 |
| KR | 10-1332757 | 11/2013 |
| WO | 2012/155937 A1 | 11/2012 |

OTHER PUBLICATIONS

Korean Office Action dated Aug. 17, 2016 in corresponding Korean Patent Application No. 10-2015-7035743.
Extended European Search Report dated Aug. 6, 2015 in corresponding European Patent Application No. 14814661.6.
PCT International Search Report dated Oct. 31, 2014 in corresponding International Patent Application No. PCT/CN2014/083791.
Chinese Office Action dated Apr. 25, 2016 in corresponding Chinese Patent Application No. 201310354128.3.

* cited by examiner

APPLICATION TAKEOVER METHOD AND SYSTEM, MOBILE TERMINAL, AND SERVER

CROSS-REFERENCE TO RELATED APPLICATIONS

This application is a continuation of International Application No. PCT/CN2014/083791, filed on Aug. 6, 2014, which claims priority to Chinese Patent Application No. 201310354128.3, filed on Aug. 14, 2013, both of which are hereby incorporated by reference in their entireties.

TECHNICAL FIELD

The present invention relates to the communications field, and in particular, to an application takeover method and system, a mobile terminal, and a server.

BACKGROUND

Generally, various applications are installed on a user terminal, and applications installed on different terminals of a same user or on different terminals of different users are not completely the same. It is assumed that a user A needs to follow and operate an application A installed on a terminal A, but when the user A cannot continue to follow or operate the application A due to reasons such as a low battery of the terminal A, the user A may upload data of the application A to an application server, download, on a terminal B of a user B or the user A, the application A, log in to the application A on the terminal B by using a user name and a password of the application A, and acquire latest data of the application A from the application server, so as to continue to follow and operate the application A on the terminal B.

Using the foregoing method needs to download and install a corresponding application on the terminal B. If the user A needs to follow multiple applications in this case, the multiple applications need to be installed on the terminal B, and subsequently accounts of all applications are used to log in to the multiple applications one by one. In this way, operations performed by a user are excessively complex, and time and traffic are consumed by downloading and installing multiple applications. In addition, these applications installed on the terminal B are very likely to be junk applications for the terminal B, which have a low utilization rate and occupy memory space.

SUMMARY

In view of this, the present invention provides an application takeover method and system, a mobile terminal, and a server, so as to resolve problems that in a takeover process, an entrusted terminal needs to download a corresponding application, and time and traffic are consumed and memory space is occupied in an operation process; and also resolve a problem that a user needs to use, on the entrusted terminal, an account to log in to an application to be taken over, and an operation is excessively complex.

According to a first aspect, an application takeover method is provided, and includes:

receiving, by a server, an application takeover instruction sent by a first terminal, where the application takeover instruction includes an identifier of a second terminal and information about an application, of the first terminal, to be taken over, the application takeover instruction is used to make the application of the first terminal be taken over by the second terminal, and the application takeover instruction is generated by the first terminal based on sending an application takeover request to the second terminal and receiving a takeover accept response returned by the second terminal; and establishing, by the server, a takeover correspondence between the first terminal and the second terminal according to the application takeover instruction.

With reference to the first aspect, in a first possible implementation manner, after the establishing, by the server, a takeover correspondence between the first terminal and the second terminal according to the application takeover instruction, the method further includes:

acquiring, by the server according to the information that is about the application and in the application takeover instruction, dynamic information of the application and operating information corresponding to the dynamic information; and sending, by the server, the dynamic information of the application and the operating information corresponding to the dynamic information to the second terminal according to the identifier of the second terminal, so as to enable the second terminal to manage the application.

With reference to the first possible implementation manner of the first aspect, in a second possible implementation manner, the enabling the second terminal to manage the application specifically includes:

receiving, by the second terminal, the dynamic information of the application and the operating information corresponding to the dynamic information;

determining, by the second terminal, an operating instruction according to the dynamic information and the operating information; and sending, by the second terminal, the operating instruction including the identifier of the second terminal to the server.

With reference to the second possible implementation manner of the first aspect, in a third possible implementation manner, after the sending, by the second terminal, the operating instruction including the identifier of the second terminal to the server, the method further includes:

receiving, by the server, the operating instruction including the identifier of the second terminal; and performing, by the server, authentication on the second terminal according to the identifier of the second terminal and the application takeover correspondence, and if the authentication succeeds, executing the operating instruction; and if the authentication fails, skipping executing the operating instruction.

With reference to the first aspect or any one of the foregoing possible implementation manners, in a fourth possible implementation manner, after the receiving, by a server, an application takeover instruction sent by a first terminal, the method further includes:

receiving, by the server, an application takeover cancel instruction sent by the first terminal.

According to a second aspect, a server is provided, and includes:

a first receiving module, configured to receive an application takeover instruction sent by a first terminal, where the application takeover instruction includes an identifier of a second terminal and information about an application, of the first terminal, to be taken over, the application takeover instruction is used to make the application of the first terminal be taken over by the second terminal, and the application takeover instruction is generated by the first terminal based on sending an application takeover request to the second terminal and receiving a takeover accept response returned by the second terminal; and a correspondence establishing module, connected to the first receiving module, and configured to establish a takeover correspondence between the first terminal and the second terminal according to the application takeover instruction.

With reference to the second aspect, in a first possible implementation manner, the server further includes:

an acquiring module, connected to the first receiving module, and configured to acquire, according to the information that is about the application and in the application takeover instruction, dynamic information of the application and operating information corresponding to the dynamic information; and a first sending module, connected to the first receiving module and the acquiring module, and configured to send the dynamic information of the application and the operating information corresponding to the dynamic information to the second terminal according to the identifier of the second terminal, so as to enable the second terminal to manage the application.

With reference to the first possible implementation manner of the second aspect, in a second possible implementation manner, the first receiving module is further configured to receive an operating instruction including the identifier of the second terminal and sent by the second terminal, and the server further includes:

an authenticating module, connected to the first receiving module, and configured to perform authentication on the second terminal according to the identifier of the second terminal and the application takeover correspondence; and an executing module, connected to the authenticating module, and configured to execute the operating instruction after the authentication performed by the authenticating module succeeds.

With reference to the second aspect or any one of the foregoing possible implementation manners, in a third possible implementation manner, the first receiving module is further configured to receive an application takeover cancel instruction sent by the first terminal.

According to a third aspect, an application takeover requesting method is provided, and includes:

sending, by a first terminal, an application takeover request to a second terminal, where the application takeover request includes an identifier of the first terminal and an identifier of an application, of the first terminal, to be taken over; and sending an application takeover instruction to a server when the first terminal receives a takeover accept response returned by the second terminal, where the application takeover instruction includes information about the application and an identifier of the second terminal, and the application takeover instruction is used to instruct the server to make the application be taken over by the second terminal With reference to the third aspect, in a first possible implementation manner, after the sending an application takeover instruction to a server when the first terminal receives a takeover accept response returned by the second terminal, the method further includes:

receiving, by the second terminal, dynamic information of the application and operating information corresponding to the dynamic information that are sent by the server;

determining, by the second terminal, an operating instruction according to the dynamic information and the operating information; and sending, by the second terminal, the operating instruction including the identifier of the second terminal to the server.

With reference to the third aspect, in a second possible implementation manner, before the sending, by a first terminal, a takeover application request to a second terminal, the method further includes:

determining, by the first terminal, the application to be taken over and the second terminal.

With reference to the second possible implementation manner of the third aspect, in a third possible implementation manner, the determining, by the first terminal, the second terminal specifically includes:

determining, by the first terminal, a terminal list by using Bluetooth, infrared, Push, NFC, a shaking technology, or a mobile phone touching technology;

acquiring, by the first terminal, an identifier of each terminal in the list; and selecting, by the first terminal, at least one terminal from the list to serve as the second terminal.

According to a fourth aspect, a mobile terminal is provided, and includes:

a second sending module, configured to send an application takeover request to a second terminal, where the application takeover request includes an identifier of the mobile terminal and an identifier of an application, of the mobile terminal, to be taken over; and further configured to send an application takeover instruction to a server when a second receiving module receives a takeover accept response returned by the second terminal, where the application takeover instruction is used to instruct the server to make the application be taken over by the second terminal; and the second receiving module, configured to receive the takeover accept response returned by the second terminal With reference to the fourth aspect, in a first possible implementation manner, the second receiving module is further configured to receive dynamic information of the application and operating information corresponding to the dynamic information that are sent by the server, and the mobile terminal further includes:

an operating instruction determining module, connected to the second receiving module, and configured to determine an operating instruction according to the dynamic information and the operating information, where the second sending module is further configured to send the operating instruction including an identifier of the second terminal to the server.

With reference to the fourth aspect or the first possible implementation manner of the fourth aspect, in a second possible implementation manner, the mobile terminal further includes:

an application determining module, connected to the second sending module, and configured to determine the application to be taken over and the second terminal.

With reference to the second possible implementation manner of the fourth aspect, in a third possible implementation manner, further includes: the application determining module determines a terminal list specifically by using Bluetooth, infrared, Push, NFC, a shaking technology, or a mobile phone touching technology, and selects at least one terminal from the list to serve as the second terminal.

With reference to the fourth aspect or any one of the foregoing possible implementation manners, in a fourth possible implementation manner, the second sending module is further configured to send an application takeover cancel instruction to the server.

According to a fifth aspect, an application program takeover system is provided, where the system includes the server according to the second aspect and the mobile terminal according to the fourth aspect, and further includes a second terminal, and the second terminal is configured to return a takeover response after receiving an application takeover request sent by the mobile terminal.

According to the technical solutions of the embodiments of the present invention, a first terminal makes an application A be taken over by a second terminal; after receiving a takeover instruction and during takeover, a server of the application A sends dynamic information of the application A of a user of the first terminal and corresponding operating information to the second terminal, and executes a corresponding operation according to an operating instruction of the second terminal, so that when the first terminal is unavailable, the second terminal may receive the dynamic information of the application A of the user of the first terminal, and send the corresponding operating instruction to the server of the application A.

According to the application takeover method and system, the mobile terminal, and the server provided by the embodiments of the present invention, a takeover correspondence between terminals is established on a server side; therefore, a user may conveniently receive, on another terminal, dynamic information of an application that is taken over and corresponding operating information. Even if another terminal takes over multiple applications, any of the applications that are taken over does not need to be installed on the another terminal, and only dynamic information and operating information that are sent by a server needs to be received, which greatly reduces consumed time and traffic. Therefore, problems that, in the prior art, in a takeover process, a terminal needs to download an application to be taken over, and time and traffic are consumed and memory space is occupied in an operation process are resolved; and a problem that, in a process of implementing takeover, a user needs to use accounts of multiple applications to log in one by one on the entrusted terminal, and an operation is excessively complex is also resolved.

BRIEF DESCRIPTION OF DRAWINGS

The accompanying drawings included in the specification and constituting a part of the specification and the specification illustrate exemplary embodiments, features, and aspects of the present invention, and are used for explaining principles of the present invention.

DESCRIPTION OF EMBODIMENTS

Figure 1:
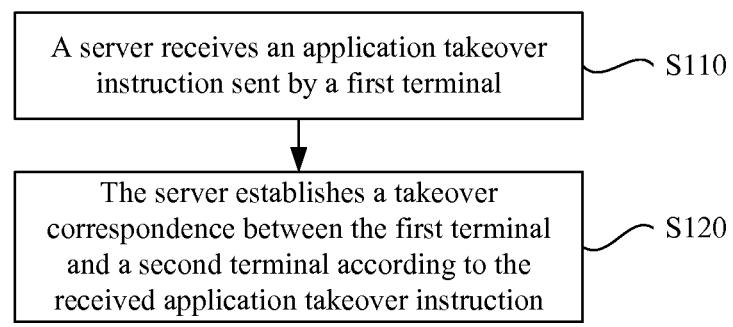
FIG. 1 is a flowchart of an application takeover method according to an embodiment of the present invention.

Various exemplary embodiments, features, and aspects of the present invention are described in detail in the following with reference to the accompanying drawings. In the accompanying drawings, identical reference numerals denote elements that have an identical or similar function. Although various aspects of the embodiments are shown in the accompanying drawings, unless otherwise specified, the accompanying drawings are not necessarily drawn to scale.

The special term "exemplary" herein refers to "can be used as an example, an embodiment, or an illustration". Any embodiment described as "exemplary" herein is not necessarily to be interpreted as optimal or better than other embodiments.

In addition, to better describe the present invention, many details are given in the following specific implementation manners. A person skilled in the art shall understand that the present invention may still be implemented even without such details. In other instances, well-known methods, means, elements, and circuits are not described in detail, so as to highlight the subject of the present invention.

Embodiment 1

As shown in FIG. 1, FIG. 1 is a flowchart of an application takeover method according to an embodiment of the present invention. The method mainly includes the following steps:

S110: A server receives an application takeover instruction sent by a first terminal The application takeover instruction includes an identifier of a second terminal and information about an application, of the first terminal, to be taken over. The information about the application may include an identifier of the application, and information about a user account of the application, such as a user name and a password.

S120: The server establishes a takeover correspondence between the first terminal and a second terminal according to the received application takeover instruction, and stores the takeover correspondence.

Embodiment 2

Figure 2:
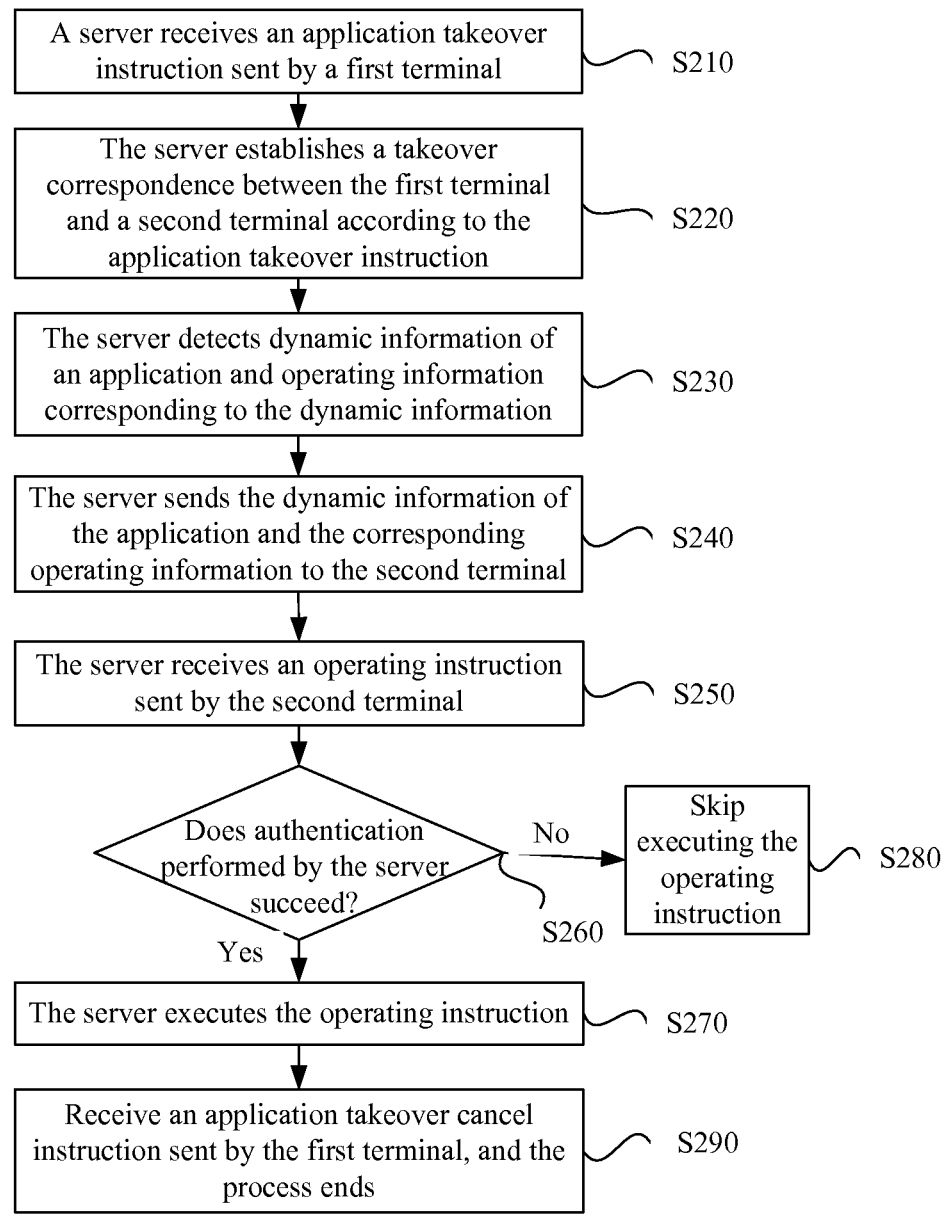
FIG. 2 is a flowchart of an application takeover method according to another embodiment of the present invention.

As shown in FIG. 2, FIG. 2 is a flowchart of an application takeover method according to another embodiment of the present invention. The method mainly includes the following steps:

S210: A server receives an application takeover instruction sent by a first terminal The application takeover instruction includes an identifier of a second terminal where an application is to be taken over and information about the application, of the first terminal, to be taken over.

S220: The server establishes a takeover correspondence between the first terminal and a second terminal according to the application takeover instruction.

In this step, the server establishes and stores the takeover correspondence between an entrusting party being the first terminal and an entrusted party being the second terminal S230: The server detects dynamic information of the application and operating information corresponding to the dynamic information.

Specifically, the server detects, according to an identifier of the application and information about a user account that are in the application takeover instruction, the dynamic information of the application corresponding to the user account and the operating information corresponding to the dynamic information.

S240: The server sends the dynamic information of the application and the corresponding operating information to the second terminal The dynamic information and the operating information may be information such as a notification or a piece of news that does not need a reply from the second terminal. In this case, the second terminal does not need to respond. The dynamic information and the operating information may also be information such as adding a friend or whether to perform upgrading, which needs the second terminal to reply. In this case, this embodiment may further include the following steps:

S250: The server receives an operating instruction sent by the second terminal.

The operating instruction is generated by the second terminal based on the dynamic information and the operating information, where the operating instruction may include the identifier of the second terminal.

S260: The server performs authentication on the second terminal.

Specifically, the server performs legality and validity authentication on the second terminal according to the established takeover correspondence and the identifier of the second terminal. If the authentication succeeds, S270 is executed; if the authentication fails, S280 is executed.

S270: The server executes the operating instruction.

S280: The server does not execute the operating instruction.

Further, the method provided by this embodiment may further include:

S290: The server receives an application takeover cancel instruction sent by the first terminal.

When a user determines that the second terminal does not need to be used to manage the application any longer, the application takeover cancel instruction may be sent to the server, and the server does not send the dynamic information and the operating information that are of the application to the second terminal any longer, so that occupation of memory of the second terminal is stopped in a timely manner.

In a possible implementation manner, in a case in which the first terminal cannot be used because the user forgets to carry the first terminal, power of the first terminal is used up, or the like, the user may access, by using a PC, a Web client that manages the first terminal, to perform application takeover according to the present invention.

In conclusion, according to the technical solutions provided by this embodiment of the present invention, a server establishes a takeover correspondence between a first terminal and a second terminal according to an application takeover instruction sent by the first terminal; and when detecting dynamic information and operating information that are of an application, sends the dynamic information and the operating information to the second terminal. Therefore, a user may conveniently manage, on at least one second terminal, the application. Even if the second terminal takes over multiple applications, any of the applications that are taken over does not need to be installed on the second terminal, so that time and traffic consumed by changing a terminal to operate an application are greatly reduced, and an operation is convenient and easy.

Embodiment 3

Figure 3:
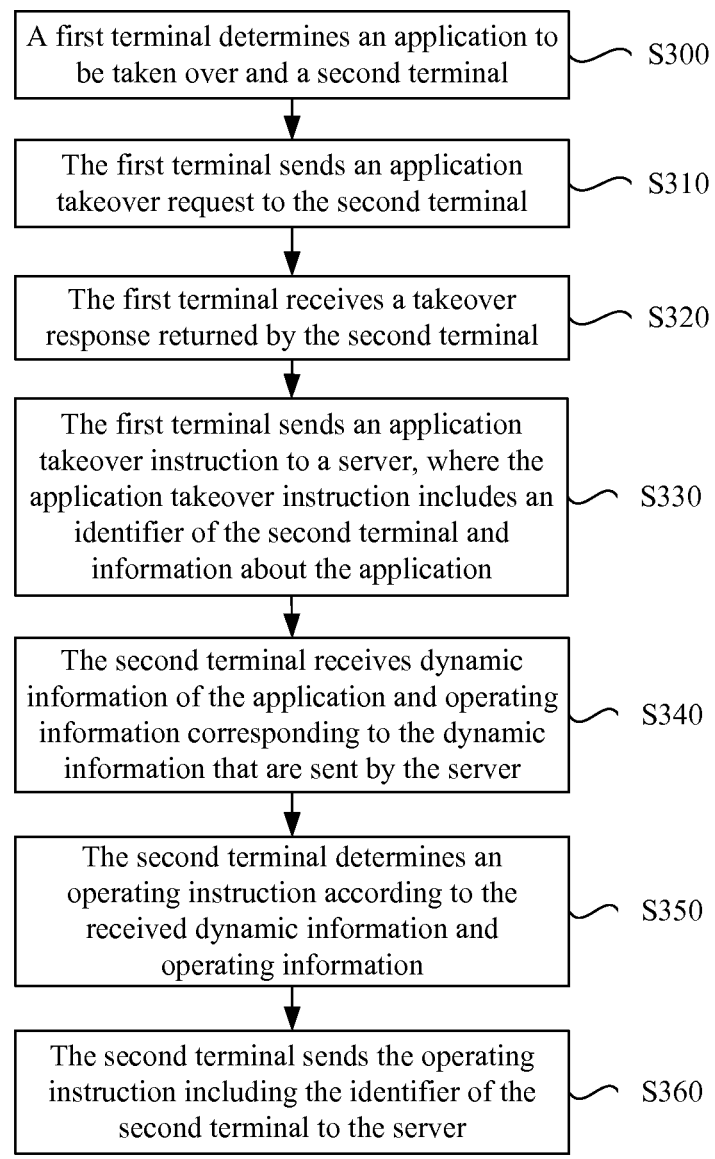
FIG. 3 is a flowchart of an application takeover requesting method according to an embodiment of the present invention.

As shown in FIG. 3, FIG. 3 is a flowchart of an application takeover requesting method according to an embodiment of the present invention. The method mainly includes the following steps:

S310: A first terminal sends an application takeover request to a second terminal.

The application takeover request includes an identifier of the first terminal and an identifier of an application, of the first terminal, to be taken over, where the identifier of the first terminal may be information that can uniquely recognize an identity of the first terminal, such as a mobile number and an Imei number of the first terminal; the identifier of the application may be a name of the application, or the like.

S320: The first terminal receives a takeover response returned by the second terminal.

The takeover response may indicate that the takeover is accepted, refused or ignored. If the second terminal returns a takeover accept response, S330 is executed; if the second terminal returns a takeover refuse response or a takeover ignore response, the process ends.

S330: The first terminal sends an application takeover instruction to a server, where the application takeover instruction includes an identifier of the second terminal and information about the application.

The server establishes a takeover correspondence between the first terminal and the second terminal after receiving the application takeover instruction, so as to enable the second terminal to manage the application. If the server detects, during the takeover, dynamic information of the application and corresponding operating information, the server sends the detected information to the second terminal. Therefore, the method may further include the following steps:

S340: The second terminal receives dynamic information of the application and operating information corresponding to the dynamic information that are sent by the server.

S350: The second terminal determines an operating instruction according to the received dynamic information and operating information.

S360: The second terminal sends the operating instruction including the identifier of the second terminal to the server.

Preferably, before the first terminal sends the application takeover request to the second terminal, the method further includes the following steps:

S300: The first terminal determines the application to be taken over and the second terminal.

Specifically, the first terminal may determine, by using a technology such as Bluetooth, infrared, Push, Near Field Communication (NFC), shaking, or mobile phone touching, a list of terminals where the application is to be taken over, obtain an identifier of each terminal in the list, and then select at least one terminal from the list to serve as the second terminal to take over the application.

Embodiment 4

Figure 4:
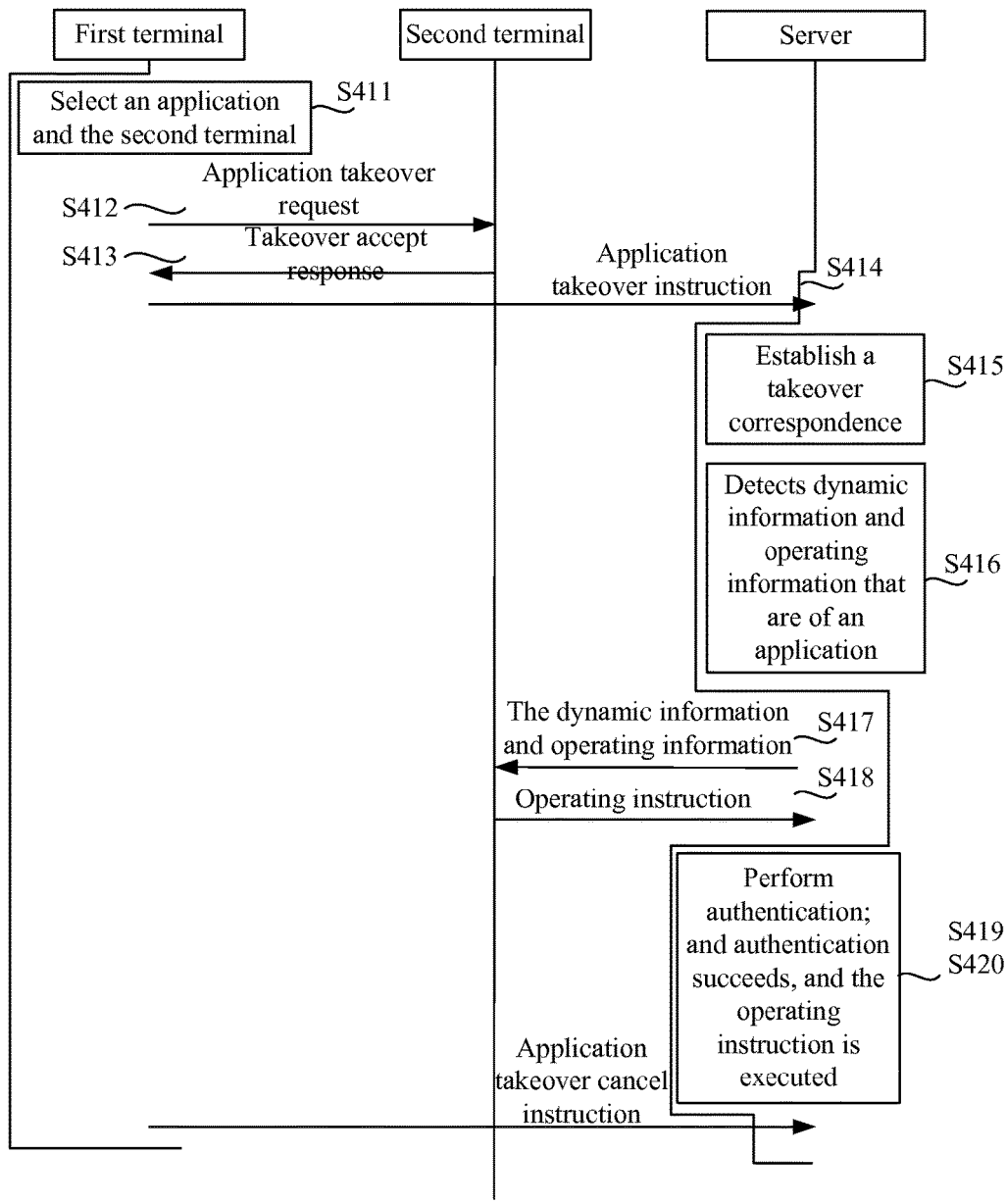
FIG. 4 is a flowchart of an application takeover method according to still another embodiment of the present invention.

As shown in FIG. 4, FIG. 4 is a flowchart of an application takeover method according to still another embodiment of the present invention. The method mainly includes the following steps:

S411: A first terminal selects an application that needs to be taken over and a second terminal.

Figure 5A:
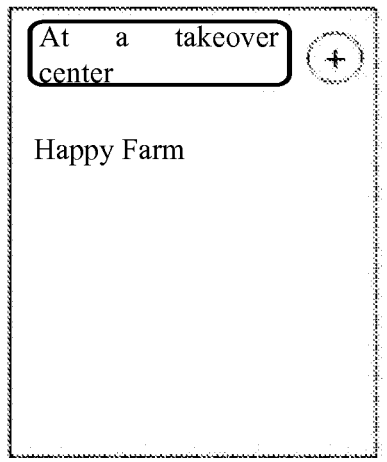
FIG. 5a is a schematic diagram of selecting an application to be taken over.

Specifically, multiple application programs may be installed on the first terminal. However, a user may not need to follow or operate all the applications while the user is not using the first terminal. Therefore, the first terminal first needs to select one or more applications that need to be taken over. With reference to FIG. 5a, in this embodiment, description is provided by using an example in which one application, such as Happy Farm, is taken over, which may be implemented by adding "Happy Farm" to a "takeover center".

Figure 5B:
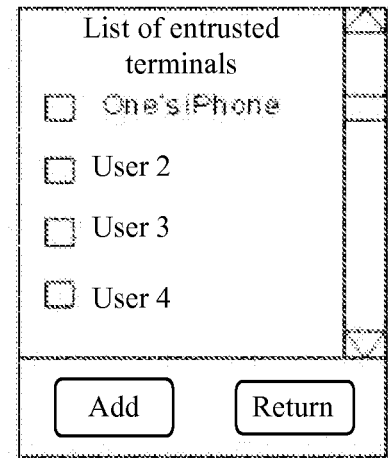
FIG. 5b is a schematic diagram of a second terminal list.

The first terminal may determine a terminal list by using a technology such as Bluetooth, infrared, Push, NFC, shaking, or mobile phone touching, acquire an identifier of each terminal in the list, and select at least one second terminal from the list to take over the application. With reference to FIG. 5b, the terminal list is displayed on the first terminal, and the first terminal selects the second terminal by selecting an "add" operation.

S412: The first terminal sends an application takeover request to the second terminal.

Figure 5C:
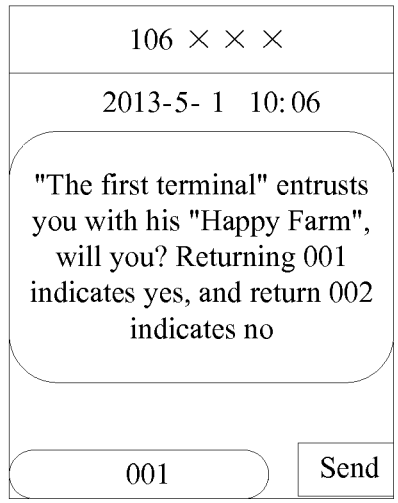
FIG. 5c is a schematic diagram of a takeover application request.

In this step, the application takeover request needs to include at least: an identifier of the first terminal and an identifier of the application to be taken over. The identifier of the first terminal may be information that can uniquely recognize an identity of the first terminal, such as a mobile number, an Imei number, an alias, or a label of the first terminal; the identifier of the application may be a name of the application, or the like. With reference to FIG. 5c, the application takeover request that is sent by the first terminal to the second terminal includes the identifier "first terminal" of the first terminal, and the identifier "Happy Farm" of the application.

S413: The first terminal receives a takeover response returned by the second terminal.

If the second terminal agrees to perform takeover, step S414 is executed; if the second terminal returns a takeover refuse response or a takeover ignore response, the process ends.

Figure 5D:
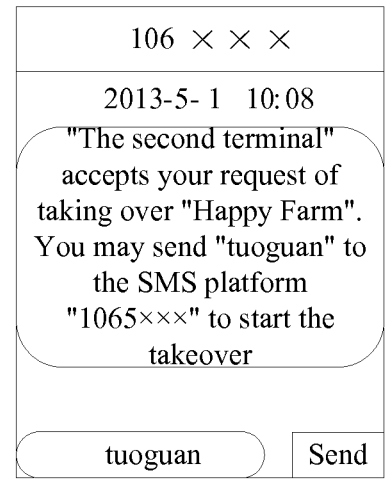
FIG. 5d is a schematic diagram of a takeover accept response.

Specifically, after receiving the takeover request, the second terminal makes a response according to a choice of a user of the second terminal, where the response may be that the takeover is accepted, refused, or ignored, and sends the corresponding takeover response to the first terminal. The first terminal receives the takeover response. With reference to FIG. 5d, the second terminal returns a takeover accept response, where the response may further include information "You may send 'tuoguan' to the SMS platform '1065xxx' to start takeover", which prompts the first terminal to perform a next operation for the takeover.

S414: The first terminal sends an application takeover instruction to a server.

Figure 5E:
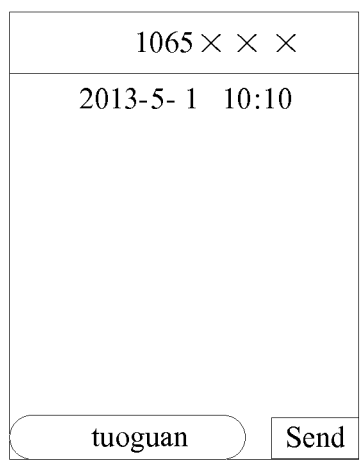
FIG. 5e is a schematic diagram of sending an application takeover instruction.

The application takeover instruction includes at least an identifier of the second terminal and information about the application, of the first terminal, to be taken over. The first terminal sends the instruction to a Happy Farm server to instruct the Happy Farm server to make Happy Farm of a user of the first terminal be taken over by the second terminal; and during the takeover, dynamic information of Happy Farm and corresponding operating information may be sent to the second terminal. The application takeover instruction may further include identifier of the application, and information about a user account, such as a user name and a login password. With reference to FIG. 5e, the first terminal sends the application takeover instruction to the Happy Farm server according to a prompt in the takeover response.

S415: The server establishes a takeover correspondence between the first terminal and the second terminal according to the application takeover instruction.

S416: The server detects dynamic information of the application and extracts operating information corresponding to the dynamic information.

Figure 5F:
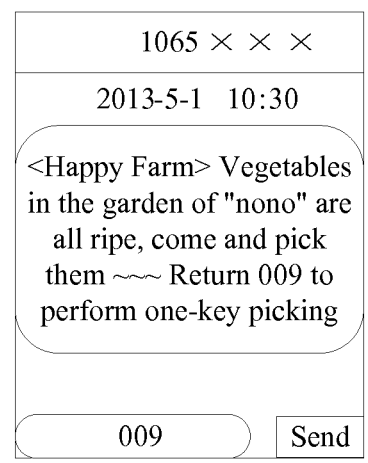
FIG. 5f is a schematic diagram of sending operating information.

S417: The server sends the dynamic information of the application and the operating information to the second terminal In this step, during the takeover, that is, before the first terminal sends a takeover cancel instruction to the server, if the server detects the dynamic information of the application and the corresponding operating information, the server sends the detected information to the second terminal. With reference to FIG. 5f, the second terminal receives the dynamic information "Vegetables in the garden of 'nono' are all ripe, come and pick them" of Happy Farm and the corresponding operating information "Return 009 to perform one-key picking" that are sent by the Happy Farm server.

S418: The second terminal sends a selected operating instruction to the server.

The second terminal sends, according to a choice of the user, a specific operating instruction to the Happy Farm server. Further, the operating instruction may also carry the identifier of the second terminal, where the identifier is used for authentication. For example, the second terminal may send "009" to the Happy Farm server.

In some cases, when the dynamic information sent by the server to the second terminal is information such as a notification or a piece of news, the second terminal does not need to reply with the operating instruction.

S419: The server performs authentication on the second terminal.

The Happy Farm server receives the operating instruction of the second terminal, and performs legality and validity authentication on the second terminal according to the identifier of the second terminal and the stored takeover correspondence. If the authentication succeeds, step S420 is executed; if the authentication fails, step S421 is executed.

S420: The server performs a corresponding operation according to the operating instruction.

For example, the Happy Farm server performs one-key picking on the ripe vegetables of Happy Farm whose user name is nono.

S421: Skip executing the operating instruction. This step is not illustrated in the figure.

S422: The first terminal sends a takeover cancel instruction to the server.

When the user determines that the second terminal does not need to be used to operate Happy Farm any longer, an application takeover cancel instruction may be sent to the Happy Farm server, and the Happy Farm server may delete the takeover correspondence, and does not send the dynamic information and the operating information that are of the application to the second terminal any longer, so that occupation of memory of the second terminal is stopped in a timely manner. Specifically, the user may cancel takeover of the application by removing the application from the "takeover center".

It should be noted that, for descriptions of a form of communication between the first terminal, the second terminal, and the server in FIG. 5a to FIG. 5f, an SMS message is used as an example. For example, the first terminal may send the application takeover request to the second terminal by using an SMS message, and the second terminal may also send the takeover response to the first terminal by using an SMS message. The SMS message may include different operation code that can be returned, so that a receiving end can make a choice.

To implement communication between the first terminal and the second terminal by using an SMS message method, a mobile number of the second terminal needs to be learned. Specifically:

The first terminal may determine the mobile number of the second terminal by using a Push technology, where the mobile number of the second terminal can be acquired when a connection is established between the first terminal and a Push server.

For the first terminal, the mobile number of the second terminal may further be manually input or loaded from an address book.

If the second terminal is determined in a Bluetooth or infrared manner, the user of the first terminal needs to manually input, or load from the address book, the mobile number of the second terminal user after determining the application to be taken over and the second terminal, so that the first terminal sends the application takeover request to the second terminal by using an SMS message.

In addition, in a process in which the first terminal sends the application takeover request to the second terminal by using an SMS message, the second terminal also acquires a mobile number of the first terminal, so that the second terminal may return a takeover response by using the mobile number.

The technical solutions provided by this embodiment of the present invention resolve problems that in a process in which a second terminal takes over an application, the second terminal needs to download the application to be taken over, and time and traffic are consumed and memory space is occupied in an operation process; and also resolve a problem that in a process in which the second terminal takes over an application, a user needs to use accounts and passwords to log in to corresponding applications on the second terminal one by one, and an operation is excessively complex.

Embodiment 5

Figure 6:
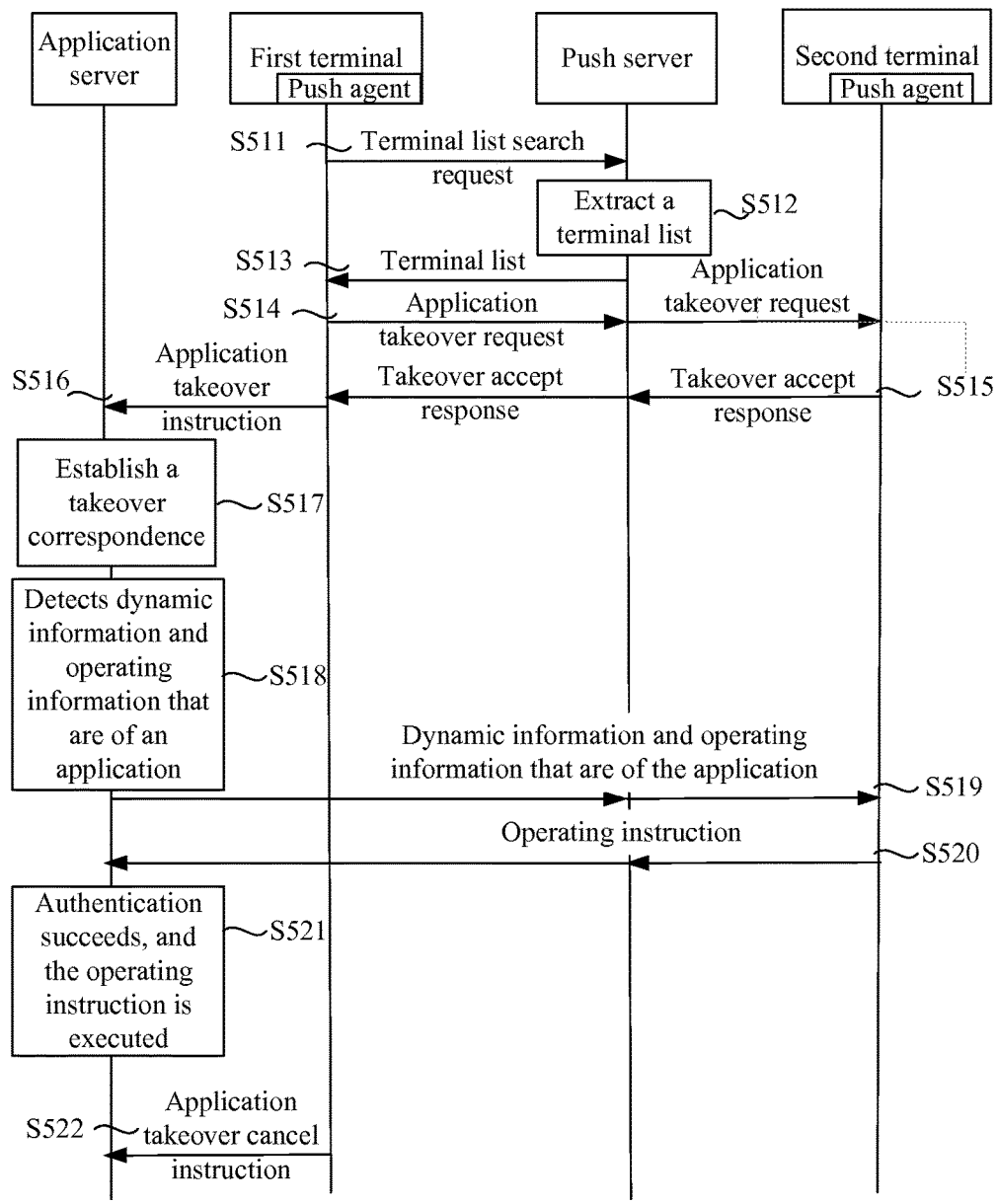
FIG. 6 is a flowchart of an application takeover method according to yet another embodiment of the present invention.

As shown in FIG. 6, FIG. 6 is a flowchart of an application takeover method according to yet another embodiment of the present invention. This embodiment is described by using an example in which an application is taken over based on a Push technology. The method mainly includes the following steps:

S511: A first terminal sends a terminal list search request to a Push server.

Request parameters of the second terminal list search request may include: an identifier of an application user, an identifier of an application, a takeover request command word, and an identifier of an entrusted terminal, such as a mobile number, an Imei number, an alias, a label, or another device identifier.

S512: The Push server extracts a terminal list.

Specifically, the Push server performs authentication on legality of the identifier of the application user, the identifier of the application, the takeover request command, and the like. If the authentication succeeds, the Push server finds, according to the identifier of the entrusted terminal, the terminal list of terminals that may be entrusted, where a Push agent (Push agent) is installed on the terminals of the found terminal list.

S513: The Push server sends the found terminal list to the first terminal

Specifically, the Push server sends the terminal list found in step S512 to the first terminal, where the terminal list includes 0 to multiple eligible terminals, and identifiers of all the terminals.

S514: The first terminal sends an application takeover request to a second terminal by using the Push server.

The first terminal selects the second terminal that is used for takeover the application from the terminal list, and sends an identifier of the selected second terminal to the Push server. The first terminal may select one or more second terminals. The Push server performs authentication on the application takeover request, and after the authentication succeeds, sends the application takeover request to the second terminal. The application takeover request includes the identifier of the application and an identifier of the first terminal.

S515: The second terminal returns a takeover response to the first terminal by using the Push server.

The second terminal performs authentication on the takeover request. After the authentication succeeds, the second terminal returns the takeover response to the first terminal by using the Push server. This embodiment is described by using an example in which a takeover accept response is returned. In a case in which the second terminal accepts the takeover, step S517 is executed.

S516: The first terminal sends an application takeover instruction to an application server.

The application takeover instruction includes at least an identifier of the second terminal and information about the application, of the first terminal, to be taken over. The information about the application may include the identifier of the application, and information about a user account such as a login password of a user.

S517: The application server establishes a takeover correspondence between the first terminal and the second terminal according to the application takeover instruction.

S518: The application server detects dynamic information of the application and extracts operating information corresponding to the dynamic information.

The application server may perform authentication on the application takeover instruction. After the authentication succeeds, the dynamic information of the application is detected and the operating information corresponding to the dynamic information is extracted.

S519: The application server sends the dynamic information and the operating information that are of the application to the second terminal by using the Push server.

The Push server may perform authentication on the operating information, and after the authentication succeeds, send the dynamic information and the operating information that are of the application to the second terminal.

Further, in step S519, the application server may further send the identifier of the second terminal and an address of the application server to the Push server at the same time, and then the identifier of the second terminal and an address of the application server are sent to the second terminal by using the Push server.

S520: The second terminal sends a selected operating instruction to the application server by using the Push server.

Further, the identifier of the second terminal may be sent to the application server at the same time for authentication.

S521: The application server performs authentication on the second terminal according to the identifier of the second terminal and the takeover correspondence, and if the authentication succeeds, executes a corresponding operation according to the operating instruction.

S522: The first terminal sends an application takeover cancel instruction to the application server.

When the user determines that the second terminal does not need to be used to operate the application any longer, the application takeover cancel instruction may be sent to the application server, and the application server does not send the dynamic information and the operating information that are of the application to the second terminal any longer, so that occupation of memory of the second terminal is stopped in a timely manner.

In addition, in order to ensure security of the second terminal, a sending process from step S519 to step S520 may be performed by using the HTTPS. In addition, the application server may allocate one authorization identifier to the second terminal, where the authorization identifier is used as an authentication identifier of the second terminal and used for authentication in a subsequent process. Therefore, information such as an identifier number of the second terminal does not need to be transmitted, thereby ensuring the security of the second terminal.

It should be noted that, a method for acquiring the identifier of the second terminal is not limited to the Push technology described in the foregoing embodiment, and may include manners such as Bluetooth, infrared, near field communication, shaking, and mobile phone touching, or a mobile number of the second terminal is directly acquired. The identifier of the second terminal acquired by using the foregoing methods may uniquely recognize the second terminal, and the identifier number may be used for a subsequent takeover request and takeover response, and a processing process of the application.

Embodiment 6

Figure 7:
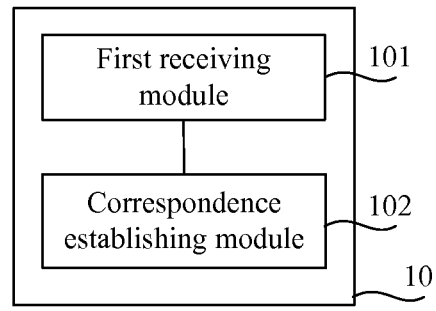
FIG. 7 is a schematic structural diagram of a server according to an embodiment of the present invention.

As shown in FIG. 7, FIG. 7 is a schematic structural diagram of a server according to an embodiment of the present invention. The server 10 includes: a first receiving module 101 and a correspondence establishing module 102.

The first receiving module 101 is configured to receive an application takeover instruction sent by a first terminal, where the application takeover instruction includes at least an identifier of a second terminal and information about an application, of the first terminal, to be taken over, the application takeover instruction is used to make the application of the first terminal be taken over by the second terminal, and the application takeover instruction is generated by the first terminal based on sending an application takeover request to the second terminal and receiving a takeover accept response returned by the second terminal. The information about the application may include an identifier of the application, and information about a user account of the application, such as a user name and a password.

The correspondence establishing module 102 is connected to the first receiving module 101, and configured to establish a takeover correspondence between the first terminal and the second terminal according to the application takeover instruction.

Figure 8:
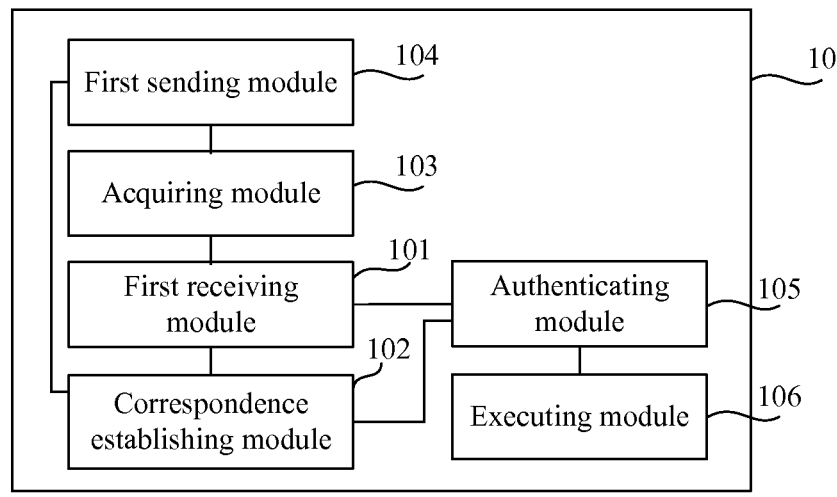
FIG. 8 is a schematic structural diagram of a server according to another embodiment of the present invention.

As shown in FIG. 8, in an exemplary implementation manner, the server 10 further includes: an acquiring module 103, a first sending module 104, an authenticating module 105, and an executing module 106.

The acquiring module 103 is connected to the first receiving module 101, and configured to acquire, according to the information that is about the application and in the application takeover instruction, dynamic information of the application and operating information corresponding to the dynamic information. Specifically, after the correspondence establishing module 102 of the server 10 establishes the takeover correspondence between the first terminal and the second terminal, the acquiring module 103, according to the identifier of the application carried in the application takeover instruction, detects the dynamic information of the application and extracts the corresponding operating information.

The first sending module 104 is connected to the first receiving module 101 and the acquiring module 103, and configured to send the dynamic information of the application and the operating information corresponding to the dynamic information to the second terminal according to the identifier of the second terminal, so as to enable the second terminal to manage the application.

Further, the first receiving module 101 is further configured to receive an operating instruction sent by the second terminal and including the identifier of the second terminal; the authenticating module 105 is connected to the first receiving module 101, and configured to perform legality and validity authentication on the second terminal according to the identifier of the second terminal and the established and stored takeover correspondence. The executing module 106 is connected to the authenticating module 105, and configured to, when the authentication succeeds, execute the operating instruction from the second terminal.

In addition, when the first terminal does not need to make the application be taken over by the second terminal, the first receiving module 101 is further configured to receive an application takeover cancel instruction sent by the first terminal.

In conclusion, according to the technical solutions in this embodiment of the present invention, a user may conveniently receive, on a second terminal, dynamic information of an application to be taken over and corresponding operating information. In addition, even if the second terminal receives takeover requests of multiple applications, any of the applications to be taken over does not need to be installed on the second terminal, any of the applications to be taken over does not need to be installed on other terminal either, and only dynamic information and operating information that are sent by a server need to be received, which greatly reduces consumed time and traffic. Therefore, problems that, in the prior art, in a takeover process, a second terminal needs to download multiple application programs to be taken over, and time and traffic are consumed and memory space is occupied in an operation process are resolved; and a problem that, in a process in which a second terminal performs takeover, a user needs to use accounts of multiple application programs to log in one by one on the entrusted terminal, and an operation is excessively complex is also resolved.

Embodiment 7

Figure 9:
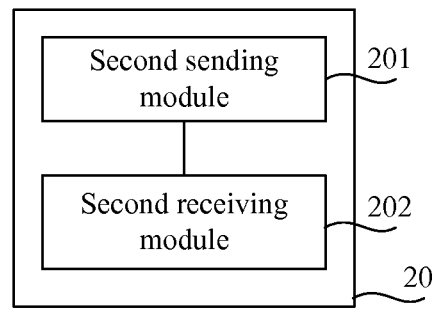
FIG. 9 is a schematic structural diagram of a mobile terminal according to an embodiment of the present invention.

As shown in FIG. 9, FIG. 9 is a schematic structural diagram of a mobile terminal according to an embodiment of the present invention. A mobile terminal 20 is the first terminal in the foregoing embodiments, and includes a second sending module 201 and a second receiving module 202.

The second sending module 201 is configured to send an application takeover request to a second terminal, where the application takeover request includes an identifier of the mobile terminal 20 and an identifier of an application, of the mobile terminal 20, to be taken over; and further configured to send an application takeover instruction to a server when the second receiving module 202 receives a takeover accept response returned by the second terminal, where the application takeover instruction is used to instruct the server to make the application be taken over by the second terminal, and the identifier of the mobile terminal may be information that can uniquely recognize an identity of the mobile terminal, such as a mobile number and an Imei number of the mobile terminal; the identifier of the application may be a name of the application, or the like. The application takeover instruction includes an identifier of the second terminal and information about the application.

The second receiving module 202 is configured to receive a takeover response returned by the second terminal. Specifically, after receiving the application takeover request, the second terminal makes, according to a choice of a user, a takeover response of accepting, refusing or ignoring, and sends the takeover response to the first terminal, and then the takeover response is received by the second receiving module 202.

Figure 10:
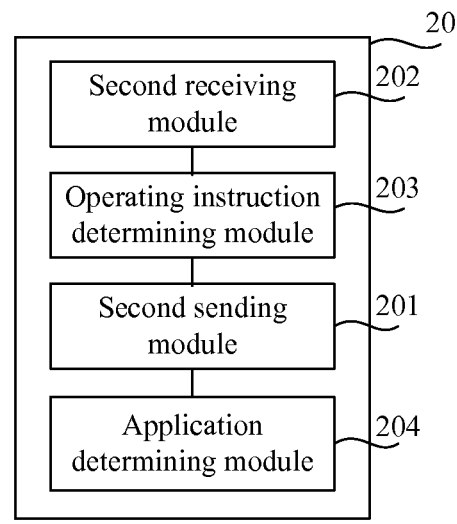
FIG. 10 is a schematic structural diagram of a mobile terminal according to another embodiment of the present invention.

As shown in FIG. 10, in an exemplary implementation manner, the mobile terminal 20 further includes: an operating instruction determining module 203, which is connected to the second receiving module 202, and configured to determine the application to be taken over and the second terminal. The second sending module 201 is further connected to the operating instruction determining module 203, and is further configured to send an operating instruction including the identifier of the second terminal to the server.

Further, the mobile terminal 20 may further include an application determining module 204, which is connected to the second sending module 201, and configured to determine the application to be taken over and the second terminal. The application determining module 204 determines a terminal list specifically by using Bluetooth, infrared, Push, NFC, a shaking technology or a mobile phone touching technology, and selects at least one terminal from the list to serve as the second terminal.

Preferably, the second sending module 201 is further configured to send an application takeover cancel instruction to the server. An application program may be canceled by using a method of dragging the application program out of a "takeover center".

Manners in which the second sending module 201 and the second receiving module 202 communicate with another mobile terminal include Push, SMS message, Email, and the like; and manners in which the second sending module 201 and the second receiving module 202 communicate with the server include a Push technology, SMS message, Email, and the like.

It is assumed that a user has multiple terminals with multiple applications installed on, and when the user goes out the user still needs to follow multiple applications, according to the method and apparatus provided by the present invention, the user does not need to carry the multiple terminals, but only needs to select one terminal to serve as an entrusted party and to make the applications that need to be followed be taken over by the entrusted terminal, which greatly improves portability of a user operation.

In a case in which a user goes out and a terminal does not have enough power and cannot be charged, an application on the terminal may be taken over by a terminal of a companion, and dynamic information and operating information that are of the application are received by using the terminal of the companion.

In a case in which the user forgets to carry the terminal or the terminal does not have enough power and cannot be charged, the user may log in to a Web client that manages the terminal to perform application takeover.

Embodiment 8

Figure 11:
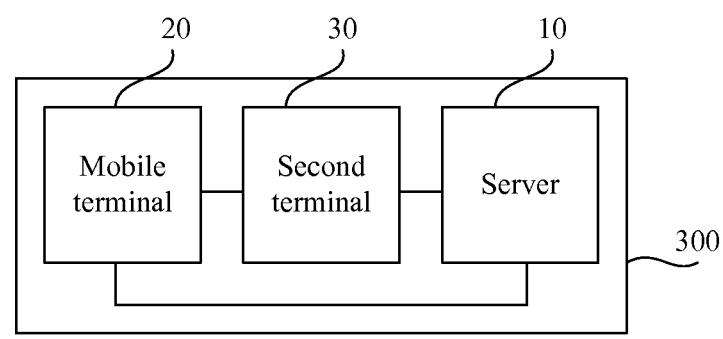
FIG. 11 is a schematic structural diagram of an application takeover system according to an embodiment of the present invention.

As shown in FIG. 11, FIG. 11 is a schematic structural diagram of an application program takeover system according to an embodiment of the present invention. A takeover system 300 includes the server 10 in Embodiment 6 and the mobile terminal 20 in Embodiment 7, and further includes the second terminal 30 in the foregoing embodiments.

Embodiment 9

Figure 12:
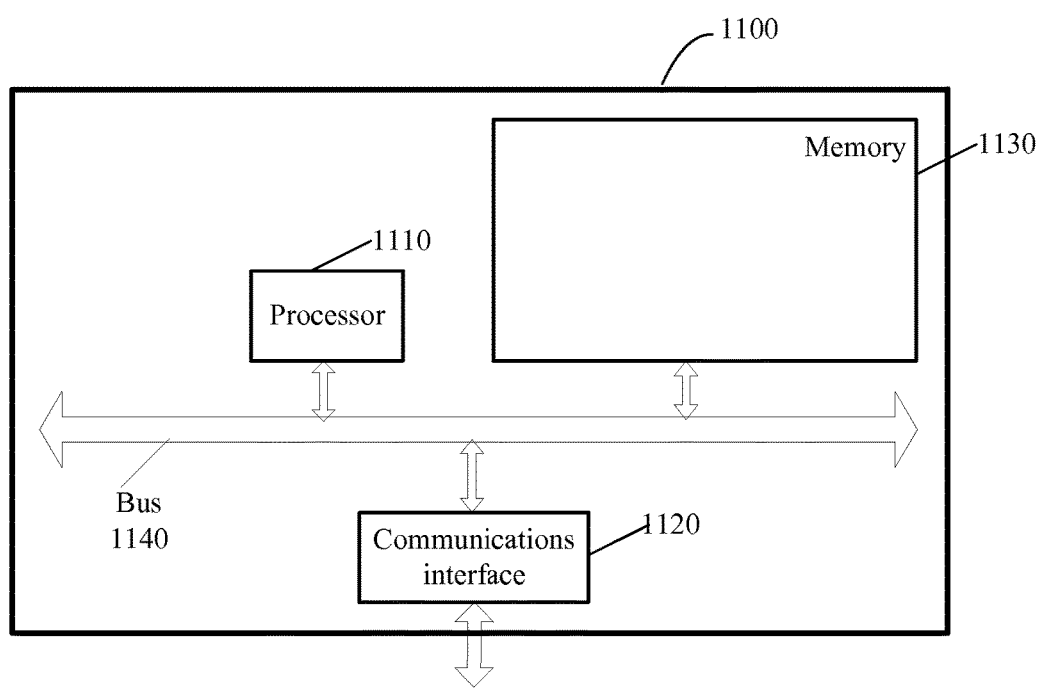
FIG. 12 is a structural block diagram of a network device according to another embodiment of the present invention.

FIG. 12 is a structural block diagram of a network device according to another embodiment of the present invention. A network device 1100 may be a host server, a personal computer PC, a carriable portable computer, or a terminal that has a computing capability. A specific implementation of a computing node is not limited in this embodiment of the present invention.

The network device 1100 includes a processor (processor) 1110, a communications interface (Communications Interface) 1120, a memory (memory array) 1130, and a bus 1140. The processor 1110, the communications interface 1120, and the memory 1130 communicate with each other through the bus 1140.

The communications interface 1120 is configured to communicate with a network element, where the network element includes a virtual machine management center, a shared memory, and the like.

The processor 1110 is configured to execute a program. The processor 1110 may be a central processing unit CPU, or an Application-specific Integrated Circuit (ASIC), or be configured to be one or more integrated circuits that implement this embodiment of the present invention.

The memory 1130 is configured to store a file. The memory 1130 may include a high speed RAM memory, and may also include a non-volatile memory (non-volatile memory), for example, at least one magnetic disk memory. The memory 1130 may also be a memory array. The memory 1130 may also be divided into blocks, and the blocks may be combined to form a virtual volume according to a specific rule.

In a possible implementation manner, the foregoing program may be program code including a computer operating instruction. The program may be specifically used for:

receiving, by a server, an application takeover instruction sent by a first terminal, where the application takeover instruction includes an identifier of a second terminal and information about an application, of the first terminal, to be taken over, the application takeover instruction is used to make the application of the first terminal be taken over by the second terminal, and the application takeover instruction is generated by the first terminal based on sending an application takeover request to the second terminal and receiving a takeover accept response returned by the second terminal; and establishing, by the server, a takeover correspondence between the first terminal and the second terminal according to the application takeover instruction.

In a possible implementation manner, after the establishing, by the server, a takeover correspondence between the first terminal and the second terminal according to the application takeover instruction, the following is further included:

acquiring, by the server according to the information that is about the application and in the application takeover instruction, dynamic information of the application and operating information corresponding to the dynamic information; and sending, by the server, the dynamic information of the application and the operating information corresponding to the dynamic information to the second terminal according to the identifier of the second terminal, so as to enable the second terminal to manage the application.

In a possible implementation manner, the enabling the second terminal to manage the application specifically includes:

receiving, by the second terminal, the dynamic information of the application and the operating information corresponding to the dynamic information;

determining, by the second terminal, an operating instruction according to the dynamic information and the operating information; and sending, by the second terminal, the operating instruction including the identifier of the second terminal to the server.

In a possible implementation manner, after the sending, by the second terminal, the operating instruction including the identifier of the second terminal to the server, the following is further included:

receiving, by the server, the operating instruction including the identifier of the second terminal; and performing, by the server, authentication on the second terminal according to the identifier of the second terminal and the application takeover correspondence, and if the authentication succeeds, executing the operating instruction; and if the authentication fails, skipping executing the operating instruction.

In a possible implementation manner, after the receiving, by a server, an application takeover instruction sent by a first terminal, the following is further included:

receiving, by the server, an application takeover cancel instruction sent by the first terminal.

According to the technical solutions in this embodiment of the present invention, a user may conveniently receive, on a second terminal, dynamic information of an application to be taken over and corresponding operating information. In addition, even if the second terminal receives takeover requests of multiple applications, any of the applications to be taken over does not need to be installed on the second terminal, any of the applications to be taken over does not need to be installed on other terminal either, and only dynamic information and operating information that are sent by a server need to be received, which greatly reduces consumed time and traffic. Therefore, problems that, in the prior art, in a takeover process, a second terminal needs to download multiple application programs to be taken over, and time and traffic are consumed and memory space is occupied in an operation process are resolved; and a problem that, in a process in which a second terminal performs takeover, a user needs to use accounts of multiple application programs to log in one by one on the entrusted terminal, and an operation is excessively complex is also resolved.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be properly defined as a computer-readable medium. For example, if software is transmitted from a website, a server or another remote source by using a coaxial cable, an optical fiber cable, a twisted pair, a digital subscriber line (DSL) or wireless technologies such as infrared ray, radio and microwave, the coaxial cable, optical fiber cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blue-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An application takeover method, comprising:
receiving, by a server, an application takeover instruction sent by a first terminal, wherein
the application takeover instruction comprises information about an application, executed by the server and installed on the first terminal, to be taken over and an identifier of a second terminal,
the application takeover instruction is used to enable the second terminal to take over management of the application executed by the server and installed on the first terminal, and
the application takeover instruction is generated by the first terminal based on sending an application takeover request to the second terminal and receiving a takeover accept response returned by the second terminal; and establishing, by the server, a takeover correspondence between the first terminal and the second terminal according to the application takeover instruction;

detecting, by the server according to the information about the application, dynamic information of the application, the dynamic information indicating occurrence of an event of the application during execution of the application by the server;

sending, by the server to the second terminal according to the identifier included in the takeover instruction, the dynamic information of the application and operating information corresponding to the dynamic information, the operating information pertaining to an operation of managing the application in response to the occurrence of the event, at least one of the dynamic information and the operating information requesting a user of the second terminal to send a reply indicating whether the operation of managing the application is to be performed;

receiving, by the server from the second terminal, an operating instruction, generated based on the dynamic information and the operating information, that instructs the server to perform the operation of managing the application; and executing, on the server, the operation of managing the application in accordance with the operating instruction and the application takeover correspondence;

receiving, by the second terminal, the dynamic information of the application and the operating information corresponding to the dynamic information;

determining, by the second terminal, the operating instruction according to the dynamic information and the operating information; and sending, by the second terminal, the operating instruction to the server, the operating instruction comprising the identifier of the second terminal and instructing the server to perform the operation of manacling the application, wherein in the sending the dynamic information and the operating information, the dynamic information and the operating information are sent to the second terminal using a text messaging platform, and in the receiving the operating instruction, the operating instructions are received from the second terminal through the text messaging platform.

2. The application takeover method according to claim 1, wherein the operating instruction comprises the identifier of the second terminal; and the executing the operation of managing the application comprises:

performing, by the server, authentication on the second terminal according to the identifier of the second terminal and the takeover correspondence, and in response to the authentication being successful, executing the operating instruction to perform the operation of managing the application.

3. The application takeover method according to claim 1, after the receiving, by a server, an application takeover instruction sent by a first terminal, further comprising:

receiving, by the server, an application takeover cancel instruction sent by the first terminal.

4. A server, comprising:

at least one memory storing instructions; and at least one processor that executes the instructions to cause the server to perform:

receiving an application takeover instruction sent by a first terminal, wherein the application takeover instruction comprises an identifier of a second terminal and information about an application, of the first terminal, to be taken over, the application takeover instruction is used to enable the second terminal to take over management of the application executed by the server and installed on the first terminal, and the application takeover instruction is generated by the first terminal based on sending an application takeover request to the second terminal and receiving a takeover accept response returned by the second terminal;

establishing a takeover correspondence between the first terminal and the second terminal according to the application takeover instruction;

detecting, according to the information about the application, dynamic information of the application, the dynamic information indicating occurrence of an event of the application during execution of the application by the server;

sending, to the second terminal according to the identifier included in the takeover instruction, the dynamic information of the application and operating information corresponding to the dynamic information, the operating information pertaining to an operation of managing the application in response to the occurrence of the event, at least one of the dynamic information and the operating information requesting a user of the second terminal to send a reply indicating whether the operation of managing the application is to be performed;

receiving, from the second terminal, an operating instruction, generated based on the dynamic information and the operating information, that instructs the server to perform the operation of managing the application; and executing, on the server, the operation of managing the application in accordance with the operating instruction and the application takeover correspondence;

receiving, by the second terminal, the dynamic information of the application and the operating information corresponding to the dynamic information;

determining, by the second terminal, the operating instruction according to the dynamic information and the operating information; and sending, by the second terminal, the operating instruction to the server, the operating instruction comprising the identifier of the second terminal and instructing the server to perform the operation of manacling the application, wherein in the sending the dynamic information and the operating information, the dynamic information and the operating information are sent to the second terminal using a text messaging platform, and in the receiving the operating instruction, the operating instructions are received from the second terminal through the text messaging platform.

5. The server according to claim 4, wherein the operating instruction comprises the identifier of the second terminal, and the executing the operation of managing the application comprises:

performing authentication on the second terminal according to the identifier of the second terminal and the application takeover correspondence; and executing the operating instruction after the authentication succeeds, to perform the operation of managing the application.

6. The server according to claim 4, wherein the at least one processor executes the instructions to cause the server to further perform:

receiving an application takeover cancel instruction sent by the first terminal.

7. An application takeover requesting method, comprising:

sending, by a first terminal, an application takeover request to a second terminal, wherein the application takeover request comprises an identifier of the first terminal and an identifier of an application, executed by a server and installed on the first terminal, to be taken over; and sending an application takeover instruction to the server when the first terminal receives a takeover accept response returned by the second terminal, wherein the application takeover instruction comprises information about the application and an identifier of the second terminal, and the application takeover instruction instructs the server to enable the second terminal to manage the application executed by the server and installed on the first terminal, such that the server:

detects, according to the information about the application, dynamic information of the application, the dynamic information indicating occurrence of an event of the application during execution of the application by the server;

sends, to the second terminal according to the identifier included in the takeover instruction, the dynamic information of the application and operating information corresponding to the dynamic information, the operating information pertaining to an operation of managing the application in response to the occurrence of the event, at least one of the dynamic information and the operating information requesting a user of the second terminal to send a reply indicating whether the operation of managing the application is to be performed;

receives, from the second terminal, an operating instruction, generated based on the dynamic information and the operating information, that instructs the server to perform the operation of managing the application, and executes, on the server, the operation of managing the application in accordance with the operating instruction and the application takeover correspondence;

receiving, by the second terminal, the dynamic information of the application and the operating information corresponding to the dynamic information;

determining, by the second terminal, the operating instruction according to the dynamic information and the operating information; and sending, by the second terminal, the operating instruction to the server, the operating instruction comprising the identifier of the second terminal and instructing the server to perform the operation of manacling the application, wherein in the sending the dynamic information and the operating information, the dynamic information and the operating information are sent to the second terminal using a text messaging platform, and in the receiving the operating instruction, the operating instructions are received from the second terminal through the text messaging platform.

8. The application takeover requesting method according to claim 7, after the sending the application takeover instruction to the server, further comprising:

receiving, by the second terminal, the dynamic information of the application and the operating information corresponding to the dynamic information that are sent by the server;

determining, by the second terminal, the operating instruction according to the dynamic information and the operating information; and sending, by the second terminal, the operating instruction comprising the identifier of the second terminal to the server.

9. The application takeover requesting method according to claim 7, before the sending, by a first terminal, a takeover application request to a second terminal, further comprising:

determining, by the first terminal, the application to be taken over and the second terminal.

10. The application takeover requesting method according to claim 9, wherein the determining, by the first terminal, the second terminal comprises:

determining, by the first terminal, a terminal list by using Bluetooth, infrared, Push, NFC, a shaking technology, or a mobile phone touching technology;

acquiring, by the first terminal, an identifier of each terminal in the list; and selecting, by the first terminal, at least one terminal from the list to serve as the second terminal.

11. A mobile terminal, comprising:

at least one memory storing instructions; and at least one processor that executes the instructions to cause the mobile terminal to perform:

sending an application takeover request to a second terminal, wherein the application takeover request comprises an identifier of the mobile terminal and an identifier of an application, executed by a server and installed on the mobile terminal, to be taken over;

receiving the takeover accept response returned by the second terminal; and in response to receiving the takeover accept response from the second terminal, sending an application takeover instruction to the server, wherein the application takeover instruction instructs the server to enable the second terminal to manage the application executed by the server and installed on the mobile terminal, such that the server:

detects, according to the information about the application, dynamic information of the application, the dynamic information indicating occurrence of an event of the application during execution of the application by the server;

sends, to the second terminal according to the identifier included in the takeover instruction, the dynamic information of the application and operating information corresponding to the dynamic information, the operating information pertaining to an operation of managing the application in response to the occurrence of the event, at least one of the dynamic information and the operating information requesting a user of the second terminal to send a reply indicating whether the operation of managing the application is to be performed;

receives, from the second terminal, an operating instruction, generated based on the dynamic information and the operating information, that instructs the server to perform the operation of managing the application, and executes, on the server, the operation of managing the application in accordance with the operating instruction and the application takeover correspondence;

receiving, by the second terminal, the dynamic information of the application and the operating information corresponding to the dynamic information;

determining, by the second terminal, the operating instruction according to the dynamic information and the operating information; and sending, by the second terminal, the operating instruction to the server, the operating instruction comprising the identifier of the second terminal and instructing the server to perform the operation of manacling the application, wherein in the sending the dynamic information and the operating information, the dynamic information and the operating information are sent to the second terminal using a text messaging platform, and in the receiving the operating instruction, the operating instructions are received from the second terminal through the text messaging platform.

12. The mobile terminal according to claim 11, wherein the at least one processor executes the instructions to cause the mobile terminal to further perform:

determining the application to be taken over and the second terminal.

13. The mobile terminal according to claim 12, wherein the determining the second terminal comprises:

determining a terminal list by using Bluetooth, infrared, Push, NFC, a shaking technology, or a mobile phone touching technology, and selecting at least one terminal from the list to serve as the second terminal.

14. The mobile terminal according to claim 11, wherein the at least one processor executes the instructions to cause the mobile terminal to further perform:

send an application takeover cancel instruction to the server.

15. An application takeover system, comprising:

the server according to claim 4;

the first terminal, being a mobile terminal including at least one processor that executes instructions stored in at least one memory included in the mobile terminal to cause the mobile terminal to perform:

sending an application takeover request to a second terminal, wherein the application takeover request comprises an identifier of the mobile terminal and an identifier of an application, executed by the server and installed on the mobile terminal, to be taken over;

receiving the takeover accept response returned by the second terminal; and in response to receiving the takeover accept response from the second terminal, sending the application takeover instruction to the server; and the second terminal, configured to return the takeover response after receiving the application takeover request sent by the mobile terminal.

* * * * *

UNITED STATES PATENT AND TRADEMARK OFFICE
CERTIFICATE OF CORRECTION

PATENT NO. : 10,205,800 B2  
APPLICATION NO. : 14/584121  
DATED : February 12, 2019  
INVENTOR(S) : Fen Yang et al.

Page 1 of 1

It is certified that error appears in the above-identified patent and that said Letters Patent is hereby corrected as shown below:

On the Title Page

Item [56], Line 12, delete "AG" and insert --KR-- therefor.

In the Claims

Claim 1, Column 19, Line 37, delete "manacling" and insert --managing-- therefor.

Claim 4, Column 20, Line 50, delete "manacling" and insert --managing-- therefor.

Claim 7, Column 21, Line 60, delete "manacling" and insert --managing-- therefor.

Claim 11, Column 23, Line 15, delete "manacling" and insert --managing-- therefor.

Signed and Sealed this  
Twenty-second Day of October, 2019

Andrei Iancu  
*Director of the United States Patent and Trademark Office*